(12) United States Patent
Wehrle et al.

(10) Patent No.: US 10,853,613 B2
(45) Date of Patent: Dec. 1, 2020

(54) OPTOELECTRONIC CODE READING APPARATUS AND METHOD OF READING CODES

(71) Applicant: SICK AG, Waldkirch (DE)

(72) Inventors: Klemens Wehrle, Waldkirch (DE); Andreas Bierer, Waldkirch (DE); Björn Denz, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/287,544

(22) Filed: Feb. 27, 2019

(65) Prior Publication Data
US 2019/0272405 A1    Sep. 5, 2019

(30) Foreign Application Priority Data
Mar. 1, 2018    (EP) .................................... 18159349

(51) Int. Cl.
*G06K 19/06*    (2006.01)
*G06K 7/14*    (2006.01)
*G06K 7/10*    (2006.01)

(52) U.S. Cl.
CPC ....... *G06K 7/1443* (2013.01); *G06K 7/10722* (2013.01); *G06K 7/10861* (2013.01); *G06K 7/1439* (2013.01); *G06K 7/1486* (2013.01); *G06K 7/1456* (2013.01)

(58) Field of Classification Search
CPC .............. G06K 7/1486; G06K 7/1404; G06K 2207/1011
USPC ............... 235/462.16, 462.18, 462.2, 462.25
See application file for complete search history.

(56) References Cited

U.S. PATENT DOCUMENTS

| | | | |
|---|---|---|---|
| 6,015,089 A | 1/2000 | Hecht et al. | |
| 9,098,764 B2 * | 8/2015 | Gallo | G06K 7/10712 |
| 9,501,681 B1 | 11/2016 | Wang et al. | |
| 2006/0180670 A1 * | 8/2006 | Acosta | G06K 7/10732 |
| | | | 235/462.31 |
| 2011/0240741 A1 * | 10/2011 | Li | G06K 7/1447 |
| | | | 235/462.11 |
| 2013/0256416 A1 | 10/2013 | Wang et al. | |
| 2013/0307977 A1 * | 11/2013 | Saporetti | G06K 7/10752 |
| | | | 348/143 |

OTHER PUBLICATIONS

Search Report dated Aug. 20, 2018 issued in corresponding European Application No. 18159349.2.

* cited by examiner

*Primary Examiner* — Daniel St Cyr
(74) *Attorney, Agent, or Firm* — Nath, Goldberg & Meyer; Jerald L. Meyer

(57) ABSTRACT

An optoelectronic code reading apparatus is provided that has at least one camera-based code reader having an image sensor for recording image data from a reading zone, that has a control and evaluation unit that comprises a decoding unit for locating code zones in the image data and for reading their code content, and that has a filter unit to determine whether a multiple reading has taken place in which a plurality of codes were read. In this respect, the filter unit is furthermore configured to check the geometry of the code zones in the case of a multiple reading to identify a valid code.

16 Claims, 4 Drawing Sheets

OPTOELECTRONIC CODE READING APPARATUS AND METHOD OF READING CODES

BACKGROUND

1. Field

The invention relates to an optoelectronic code reading apparatus that has at least one camera-based code reader having an image sensor for recording image data from a reading zone, that has a control and evaluation unit that comprises a decoding unit for locating code zones in the image data and for reading their code content, and that has a filter unit to determine whether a multiple reading has taken place in which a plurality of codes were read. The invention further relates to a method of reading codes in which image data are recorded from a reading zone, code zones are located therein, and their code content is read out, and wherein it is determined whether a multiple reading has taken place in which a plurality of codes were read.

2. Description of the Related Art

Code readers are known from supermarket checkouts, for automatic parcel identification, for sorting mail shipments, from baggage handling at airports, and from other logistics applications. The object side to which the code is applied and the orientation in which it is applied are frequently not fixed. A plurality of code readers are therefore frequently attached in different perspectives to record objects from a plurality of sides or from all sides.

In a code scanner, a reading beam is guided transversely over the code by means of a rotating mirror or by means of a polygon mirror wheel. This technology was predominant in the past and was originally the only available technology. In the meantime, camera-based code readers that record images of the object having the codes located thereon by means of an image sensor are increasingly also becoming established in said applications. Image evaluation software extracts the code information from these images. As part of the technological change, hybrid systems are also being used in which both code scanners and camera-based code readers are installed.

However, new problems also occur due to the improved reading capabilities of the camera-based code readers. For example, some pieces of baggage at an airport still have old barcodes, that are also called stub codes, with previous destinations on them that have not been completely removed in addition to the main codes to be detected. Such stub codes are comparatively small, that is they have a small height or line length, and were overlooked by the code scanners or whose full length was at least not swept over and was therefore not completely detected.

Such stub codes are now also successfully decoded using today's camera technology. This then results in a multiple reading, namely of the actual main code and of the stub code. Due to a lack of clarity of the sorting destination, an error is reported (Multiread) and a manual reprocessing or a manual sorting is required as a rule. It is not a solution simply to artificially reduce the decoding ability of the camera-based code readers so that the stub codes are overlooked as before since the advantage of the improved reading capability of main codes would then also be lost. The additional error source from the viewpoint of purely scanning systems, however, cancels out the advantages otherwise achieved with camera-based code readers. Particularly on a retrofitting, i.e. on a conversion of existing systems based on code scanners to camera-based systems or hybrid systems, an adaptation of the data interface for validating the code contents would at best be able to be implemented in the higher ranking control with a large amount of effort.

SUMMARY

It is therefore the object of the invention to reduce the error rate of an optoelectronic code reading apparatus.

This object is satisfied by an optoelectronic code reading apparatus and by a method of reading codes in accordance with the respective independent claim. The code reading apparatus comprises at least one camera-based code reader, typically a plurality thereof in different perspectives, with hybrid systems having at least one code scanner also being conceivable. The camera-based code reader records image data of the reading zone and a decoding unit finds code zones therein and decodes them. In addition, a filter unit determines whether a plurality of codes were read (Multiread). This in particular means a plurality of codes of different content; redundant codes or a multiple reading of the same code would not have the consequence of ambiguity in the treatment of the code-bearing object. The conventional response to a multiple reading is an error output and a manual treatment.

The invention now starts from the basic idea that an attempt is made in the event of a multiple reading to distinguish the main code to be evaluated from accidentally read additional codes such as the stub codes named in the introduction. The geometry of the respective code zone is examined for this purpose. This can be the geometry of the code itself, but also the geometry of the label on which the code is located. A corresponding segmentation of code zones, for example using additional sensor information, color criteria, or contrast criteria, has anyway taken place in the decoding unit as part of the readout so that the geometry is available in principle, but is conventionally not further taken into account. A decision is made on the basis of the geometry as to which of the plurality of codes is a valid code and which code, for example, can be discarded.

The invention has the advantage that errors due to multiple reading can be dramatically reduced by a very simple measure and the reading and sorting rate is correspondingly improved. Camera-based code readers with their advantages with respect to code scanners can thus be used without an additional error source thereby arising, in particular by the reading of stub codes.

The filter unit is preferably configured to check the geometry with reference to the ratio of width to height. The implicit assumption of rectangular code zones, labels or codes is permitted since codes are typically used in this form. This aspect ratio is a very simple criterion that can be checked without any effort. At the same time, it is a very selective criterion with respect to stub codes. This is important since it would be counterproductive if the reading rate were again to be impaired by a false exclusion of main codes read per se.

The filter unit is preferably configured to check whether the geometry corresponds to a square. A main code is at least more or less square. Mathematical exactitude is by no means of importance here. A stub code has a small height in comparison with its width, with the height being defined as the direction in parallel with the lines of a barcode. Only a distinction with respect to such clearly elongated rectangles should be made via the criterion of the geometry of a square.

The filter unit is preferably configured to recognize a code with a geometry having an aspect ratio of at least 1.5:1 as not square. The aspect ratio again designates the ratio of width to height. A threshold from when a code is no longer considered square is given by the figure 1.5:1. Sharper thresholds are conceivable, generally at n:1 for any desired, also non-whole number n≥2. n=2, 3, 4, 5 can be explicitly named as examples.

The filter unit is preferably configured to consider a non-square code as an invalid code. The filter unit thus applies the geometrical criterion that stub codes typically have a small height. Conversely, an at least largely square code will be considered as a main code.

The filter unit is preferably configured to suppress an output of code content of invalid codes. Invalid codes are therefore no longer passed on to the outside or filtered. Only the codes identified as valid, in particular sufficiently square codes, are output. The code reading apparatus behaves toward the outside as if it were unable to read the stub code. The code reading apparatus, however, continues to profit from its improved reading capabilities on the detection of main codes.

The filter unit is preferably configured to output a multiple reading message in the case of a plurality of codes identified as valid. This preferably applies only to a plurality of codes of different content identified as valid since only then does a real ambiguity arise with respect to the further treatment of the object bearing the code. If a plurality of main codes are read, the multiple reading has nothing to do with stub codes. The geometrical criterion is possibly also used at this point to distinguish between the main code and the stub code at its limits. At least an error message is output in such a case as beforehand that indicates a multiple reading (Multiread). A manual reprocessing or manual sorting presumably has to follow. This case, however, occurs much more rarely than conventionally since at least the stub codes that can be identified using the geometry no longer trigger such a multiple reading message.

The filter unit is preferably configured to output a multiple reading message in the case of no codes identified as valid, but of multiple codes identified as invalid. This is the mirror case in which no main code at all remains in accordance with the geometrical criterion. This can actually be the case; the error cause in this event is outside the code reading apparatus. It may still be found as part of the manual reprocessing that one of the read codes actually was a main code that, however, differs too little geometrically from a stub code. The multiple reading message can advantageously differ from that with a plurality of read main codes of the previous paragraph as an aid for the manual reprocessing. Expressed in simple terms, too many main codes were read there and too few here and a suitable indication of this difference facilitates the manual post-treatment.

The decoding unit is preferably configured to decode barcodes. Even more preferably, the decoding unit is only configured to read barcodes. Barcodes are accordingly applied as codes to be detected in the application. A barcode is actually a 1D code, although naturally a real barcode takes up a 2D surface. Its one-dimensional nature is, however, a reason why the height of the code in parallel with its lines and thus also the aspect ratio are conventionally irrelevant and remain out of consideration.

The decoding unit is preferably implemented in the code reader and the filter unit is implemented in a system unit outside the code reader. The functionality of the control and evaluation unit with the decoding unit and filter unit can be split in different manners among the components of the code reading apparatus. An advantageous embodiment assigns the actual code reading and thus the decoding unit to the code reader. The filter unit preferably works with the data of all the involved code readers and/or data of a plurality of time periods (frames) to have all the relevant code information of an object available. For this purpose, the control and evaluation unit comprises a central system unit with the filter unit outside the code reader.

The decoding unit is preferably configured to output the ratio of width to height to the filter unit. As part of the decoding, the image data are as a rule segmented as a pre-processing step. The width and height or their ratio are/is therefore detectable without any great additional effort in the decoding unit. It is therefore advantageous to hand over these values instead of the filter unit again having to make use of the image data. This data handover is particularly useful if the decoding unit is associated with the code reader and the filter unit is associated with a central system unit.

The code reading apparatus preferably has a geometry detection sensor for detecting code-bearing objects. It is, for example a laser scanner that measures the objects. The object geometries are used to associate the read codes with a specific object. Ambiguities in read codes preferably relate to the same object since different objects typically bear different codes in accordance with their intended purpose. The geometry detection sensor is in particular advantageous when a plurality of objects may be present in the reading zone of the code reader. A alternative is to ensure that only one respective object can be detected such as with individually introduced pieces of baggage or conveying systems that do not mechanically ensure any separation.

The code reading apparatus is preferably installed at a baggage sorting system, in particular of an airport. This is a typical application situation in which invalid codes or stub codes are to be anticipated.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in:

DETAILED DESCRIPTION OF THE PREFERRED EMBODIMENTS

Figure 1:
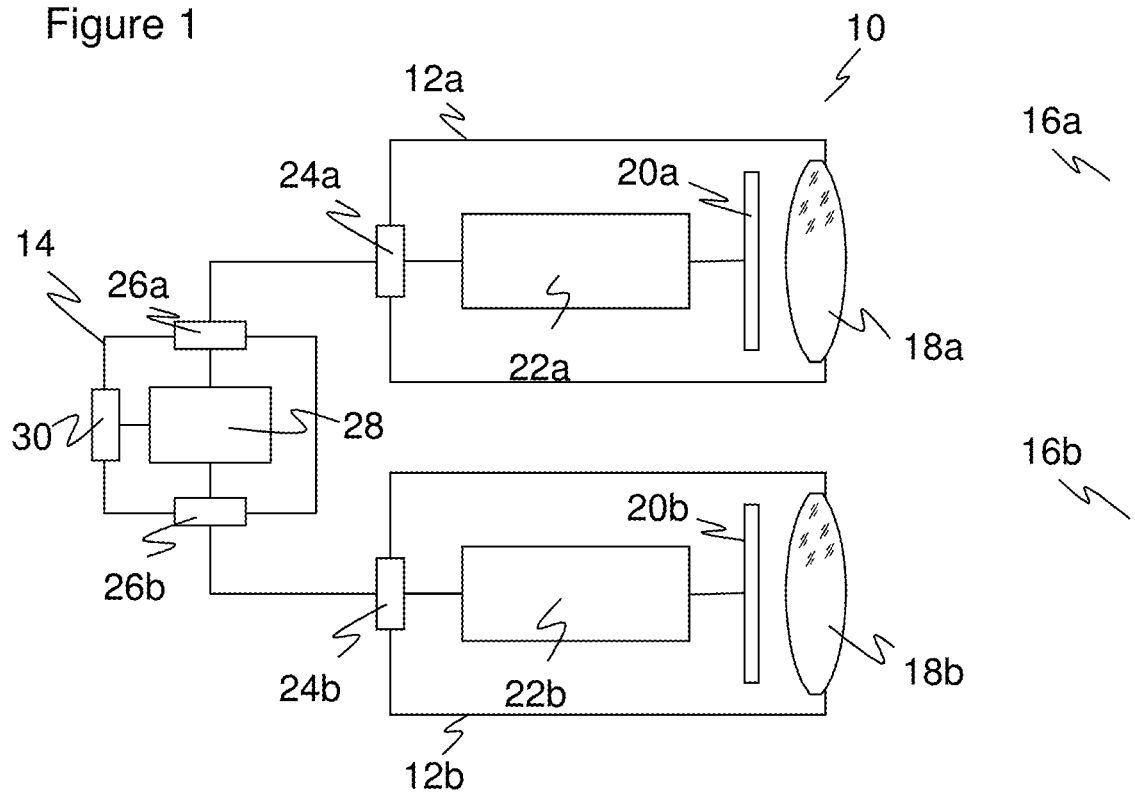
FIG. 1 a block diagram of a code reading apparatus.

FIG. 1 shows a block diagram of a code reading apparatus 10. The code reading apparatus 10 here has by way of example two camera-based code readers 12a-b and one system unit 14 as a central control. Other embodiments have further camera-based readers, only one camera-based code reader or, in a hybrid system, at least one additional barcode scanner.

The respective code reader 12a-b is a camera in its basic structure that directs received light from a reading zone 16a-b via a reception optics 18a-b shown in simplified form as a single lens onto an image sensor 20a-b, for example onto a matrix arrangement of light reception elements or pixels. On a relative movement between the code reader 12a-b and objects to be detected, line scan cameras are also conceivable that gradually compose a total image in the course of the relative movement. The structure shown is purely schematic and grossly simplified; for example, an advantageous active illumination unit has been omitted and the electronics have largely been omitted.

A respective decoding unit 22a-b evaluates the image data by means of image evaluation and decoding processes to locate code zones therein and to read out the information coded there. Image processing methods for segmentation and for the actual decoding are known per se; they are only applied as part of the invention and are therefore not explained in any more detail.

The results of the decoding are provided at an interface 24a-b. The system unit is connected at corresponding interfaces 26a-b to the code readers 12a-b and so has access to the code information of the all code readers 12a-b of the code reading apparatus 10. The interfaces 24a-b, 26a-b or further connections can also be used for central control work that will not be looked at any further here.

Figure 3:
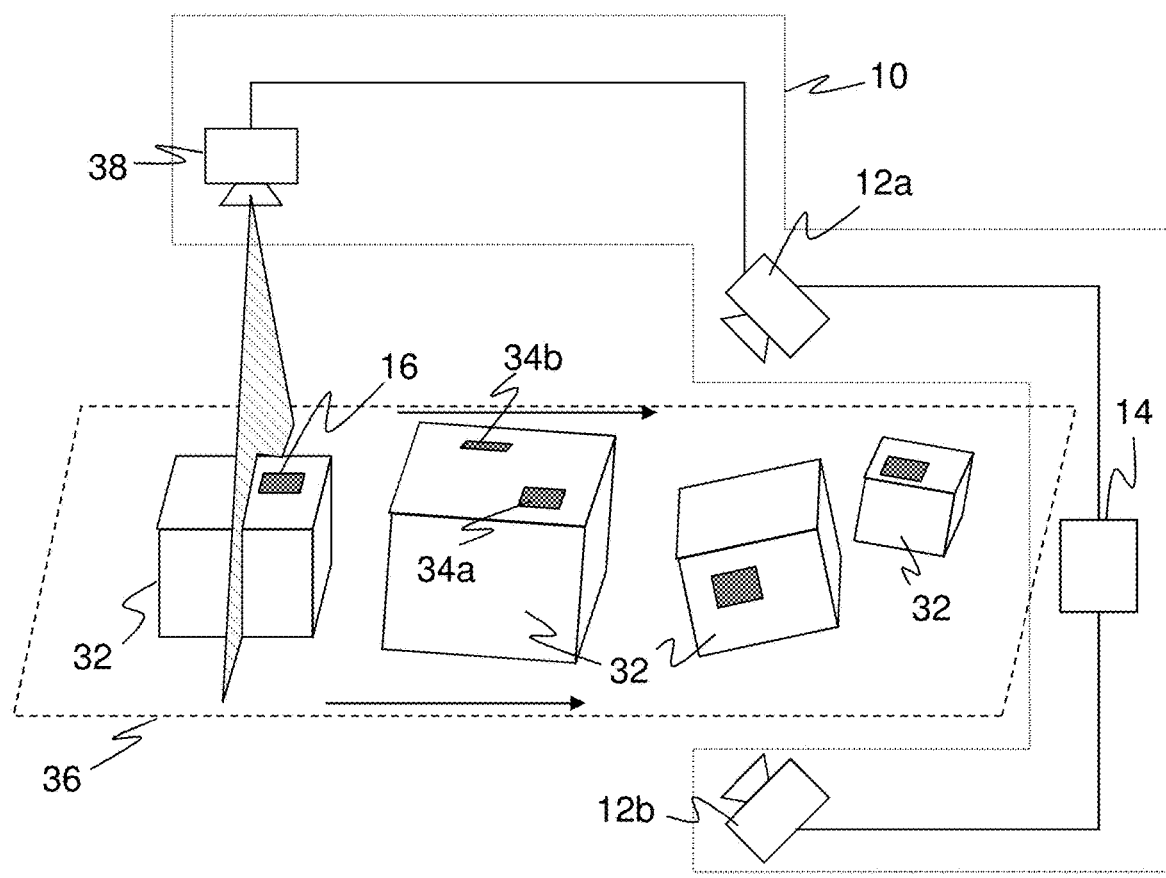
FIG. 3 a three-dimensional view of a code reading apparatus as a reading tunnel at a conveyor belt.

A filter unit 28 examines the decoding results for multiple readings in a manner to be explained more exactly with reference to FIG. 3 and in this case decides, where possible with reference to the geometry of code zones, which code is to be considered valid. Consolidated reading results, in particular only those of valid codes, and error messages or other reports are output via a central output interface 30. Depending on the application, the output of further data is also possible such as raw or pre-processed image data and the like.

FIG. 1 represents the code reading apparatus 10 with the decoding unit 22a-b in the code readers 12a-b and the filter unit 28 in the central system unit 14. There are a number of alternatives to this advantageous distribution. The one extreme centralizes completely in that the code readers 12a-b only deliver image data and both the decoding unit 22a-b and the filter unit 28 are accommodated in the system unit 14. In the other extreme case, the code reader 12a-b already comprises both the decoding unit 22a-b and the filter unit 28. There is then no system unit 14 or at least it is not responsible for the work of decoding and filtering described here However, only image data restricted to the individual perspective are available in the code readers 12a-b so that only some of the multiple readings are noticeable. Practically any desired job distributions are conceivable between these extremes. In addition, the system unit 14 can also be integrated in one or more code readers 12a-b that then act as a kind of master code reader.

Figure 2:
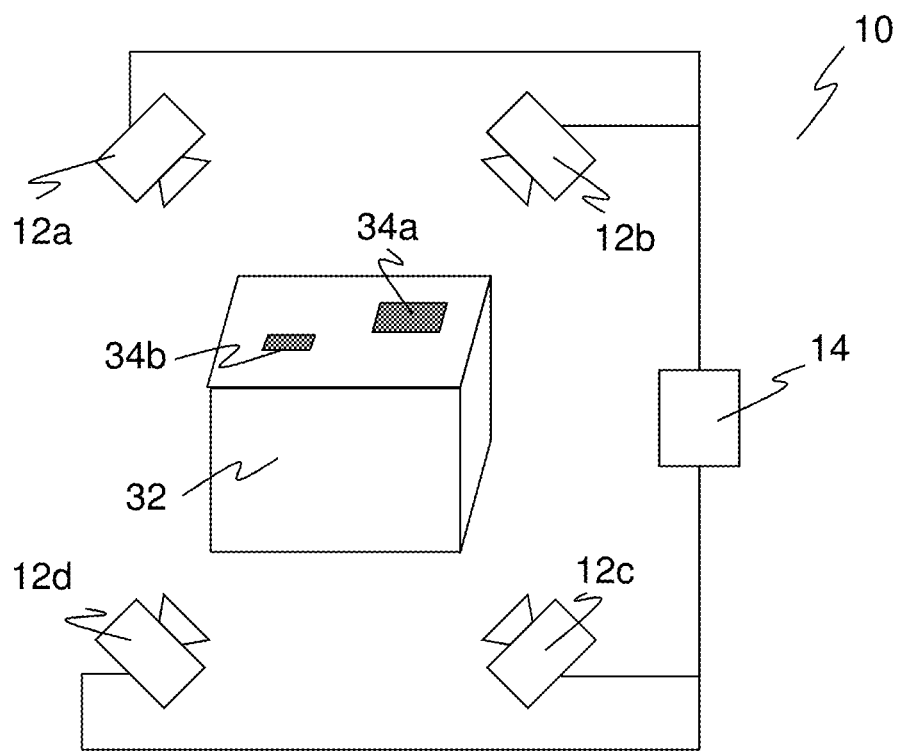
FIG. 2 a schematic representation of a code reading apparatus at an object.

FIG. 2 shows a schematic representation of the arrangement of a code reading apparatus 10 at an object 32. In this embodiment, four code readers 12a-d are provided, with this number again only being an example. As long as the side at which the object 32 bears codes 34 is not fixed by the application, a plurality of perspectives by a plurality of code readers 12a-d are advantageous. Other examples are six code readers from all six sides, but also, for example, four code readers in different orientations from above, four code readers in pairs at both sides with an alignment to the front and rear, or (part) combinations thereof.

The object 32 shown bears two codes 34a-b at its upper side. On the reading procedure, a plurality of code readers 12a-d will now read code 34a or code 34b multiple times under certain circumstances due to partly overlapping reading zones 16a-b. This kind of multiple reading is not harmful. On the one hand, it can be very simply determined that the code information is identical. In addition, which set of redundant code information is further processed is ultimately irrelevant since it produces the same result.

The case is of interest that only one code 34a is a main code having relevant information; the other code 34b is in contrast an invalid code. An example for this includes the stub codes named in the introduction. Such codes 34a-b can contain mutually contradictory information so that such multiple readings require a special treatment. As also shown in FIG. 2, main codes and stub codes have different geometries, in particular aspect ratios, with reference to which the filter unit 28 distinguishes the types and thus the relevance of the codes 34a-b.

FIG. 3 shows a three-dimensional view of a code reading apparatus 10 as a reading tunnel at a conveyor belt 36 that conveys the objects 32 through the reading zone 16a-b of the code readers 12a-b. The code reading apparatus 10 here again comprises two code readers, purely by way of example; more code readers or only code reader are/is equally conceivable. An additional optional geometry detection sensor 38 is installed above the code readers 12a-b with respect to the conveying direction indicated by arrows. Objects 32 can thus be measured and the codes 34a-b can in particular be associated with specific objects 32. A further redundancy arises by the plurality of code readers 12a-b due to the conveying movement in addition to a possible redundancy in the code detection because the codes 34a-b are repeatedly detected in different conveying positions. This kind of multiple reading is, as already stated above for the case of a plurality of code readers 12a-b having partly overlapping reading zones 16a-b, not harmful due to the redundant code information.

Figure 4:
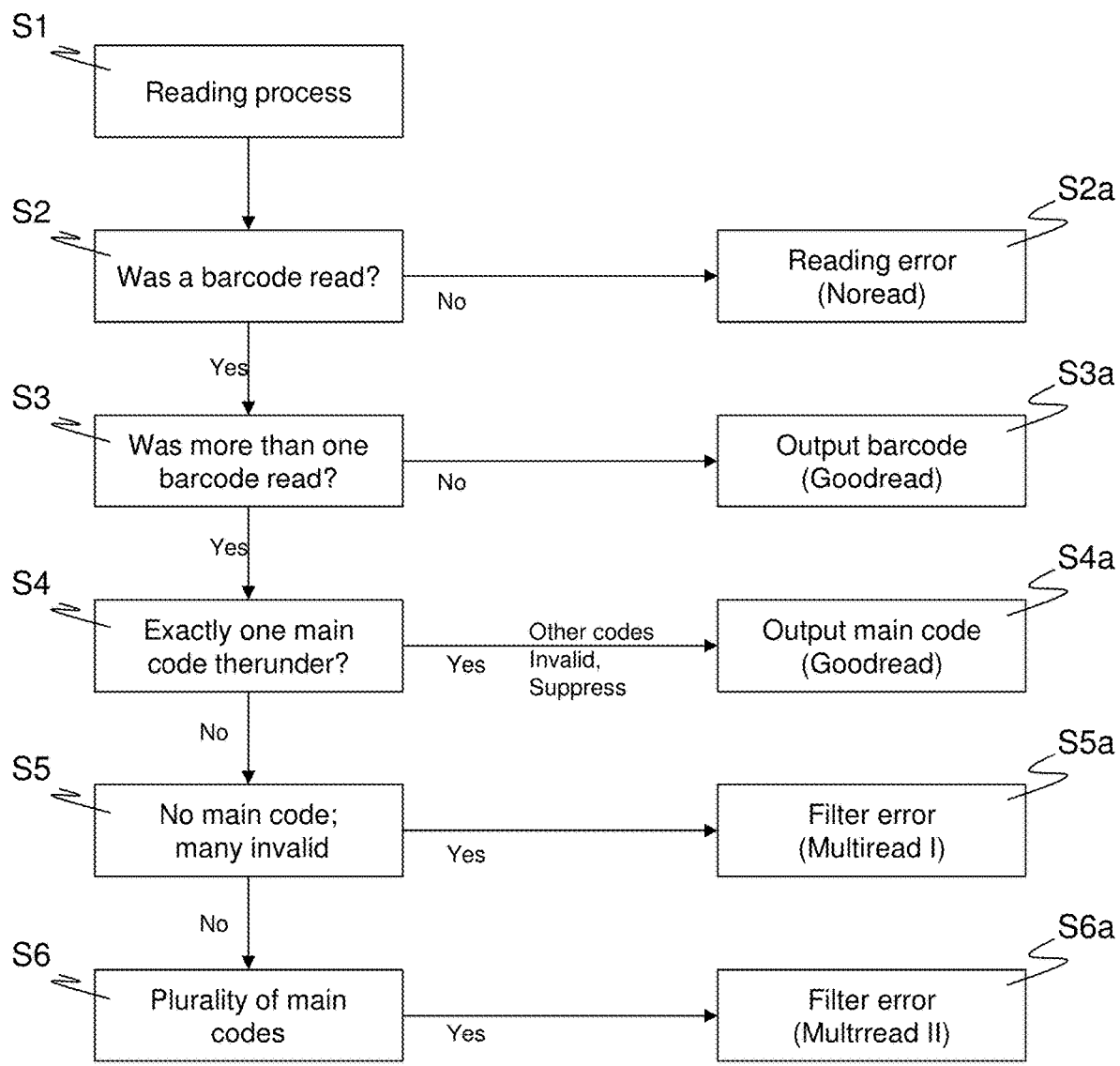
FIG. 4 a flowchart for avoiding multiple readings by recognizing main codes and invalid codes.

FIG. 4 shows a diagram for a routine in the filter unit 28 to avoid multiple readings by recognition of main codes 34a and invalid codes 34b with reference to the geometry. This routine is an example for a total routine that is not to be understood as restrictive either with respect to the order or to the individual, partly optional steps. In the diagram, the codes 34a-b are called barcodes, which is again an advantageous embodiment, but not the only one.

The codes 34a-b are first detected and read out by the code readers 12a-b in a step S1 as part of a reading process. A reading process preferably comprises all the detections of the codes 34a-b, either by a plurality of code readers 12a-b and/or a plurality of conveying positions in accordance with FIG. 3 until the related object 32 has left the reading zones 16a-b. This is a reason why the filter unit 28 is advantageously implemented in the central system unit 14 that thus has access to all the code reading results.

A check is made in a step S2 whether a code 34a-b was read at all as part of the reading process in step S1. If this is not the case, a reading error (Noread) is output in a step S2a.

A check is then made in a step S3 whether more than one code 34a-b was read. If not, no multiple reading is present and the only read code is output in a step S3a (Goodread). As already repeatedly mentioned, multiple reading does not mean that one and the same code 34a or 34b was read by a plurality of code readers 12a-b and/or at a plurality of points in time. This is otherwise filtered or ignored with reference to the identical code information because a multiple assignment of the correct, redundantly read code information to an object 32 would not be harmful with the exception an unnecessary abundance of information.

If the routine is now not yet ended, a multiple reading of at least two different barcodes 34a-b is present that has to be looked at more exactly; that is, to remain with the example, both the code 34a and the code 34b were read and both contain contradictory information.

A check is now made in a step S4 whether one of the plurality of read codes 34a-b is a main code 34a. For this purpose, a geometrical criterion is used that is the geometry of the code zones having the codes 34a-b is evaluated. Due to the segmentation as part of the decoding, such geometry information is preferably available with a repeat processing of the image data themselves and can also already be provided directly by the decoding unit 20a-b.

In a preferred embodiment, the aspect ratio is checked, i.e. the ratio of width to height of the code zones. With barcodes, the height is given by the line length. A main code 34a is assumed when the aspect ratio corresponds to an at least approximately square shape. For in particular with airport labels, main codes 34a are at least more or less square; invalid codes 34b or stub codes are in contrast much wider than high. The square shape can be defined, for example, by a threshold of the aspect ratio. A main code 34a is thus, for example, assumed at an aspect ratio of at most 1.5:1 or, conversely, an invalid code 34b is assumed at an aspect ratio of at least 1.5:1. Other values n:1, in particular with n=2, 3, 4, 5, . . . 10 or a non-whole number are conceivable. The value for n can also be selected relative to the shapes present. In illustrative terms, the shapes most closely corresponding to a square among the currently detected codes 34a-b are classified as main codes 34a, the remainder as invalid codes 34b.

If it is now found in step S4 that exactly one code 34a-b is a main code 34a in accordance with the geometrical criterion, this code 34a is output in a step S4a (additional Goodread). The at least one further code 34b, that has been recognized as invalid, is suppressed and not output. A piece of information that or how many invalid codes 34b were suppressed is possible. Alternatively, invalid codes 34b are also output, but are marked as such. The handling of invalid codes 34b can be selected by the demands in the respective application.

If there is not exactly one main code 34a in accordance with step S4, the filter unit 28 cannot validate the multiple reading, an error message (Multiread) remains and, typically, a manual post-processing or a manual sorting. It is then not clear which code 34a-b is the main code 34a to be evaluated.

Two cases can, however, still be distinguished in this respect. A check is made in step S5 whether a main code 34a is not present at all. All the read codes 34a-b are therefore a lot wider than high and thus classified as invalid codes 34b.

Otherwise only the case of step S6 remains in the routine logic that at least two read codes 34a-b have a substantially square shape and were therefore considered a main code 34a.

It may actually be the case in both cases that the object 32 is incorrectly marked by codes 34a-b or that the geometrical criterion was not distinctive enough for this special case. The filter unit 32 can at least not solve the problem; an error message is therefore respectively output in a step S5a or S6a. This error message can, however, still differentiate the two cases to support the manual post-processing or error diagnosis. In addition, the read code information can also be output with the error message.

Figure 5:
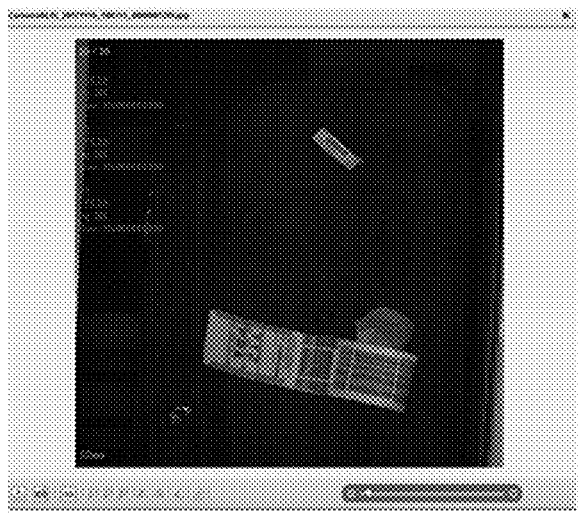
FIG. 5 examples of real camera images with code zones to be detected.
Figure 5:
Figure 5:
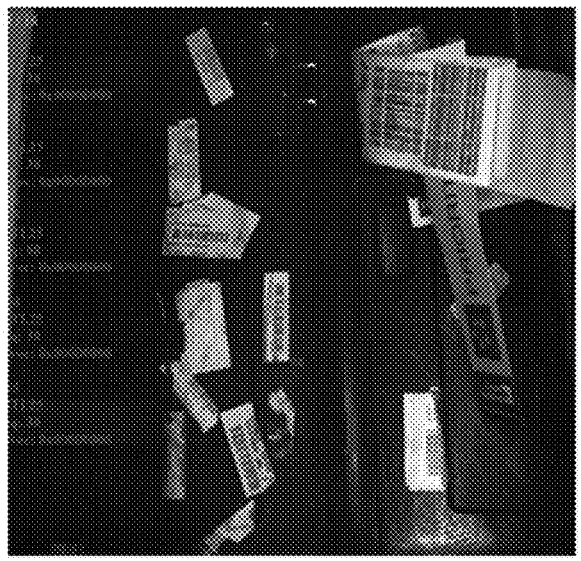
Figure 5:

FIG. 5 shows four examples of real camera images having code zones to be detected. In all four examples, a plurality of codes of different content are read; there would therefore conventionally be reading errors (Multiread). In accordance with the invention, a main code can be identified, for example after step S4, S4a of the flowchart of FIG. 4, and the additional stub codes are suppressed.

At the top left in the drawing of FIG. 5, a wrapper having two main codes can be seen in the lower part and a further narrow stub code at the top. The two main codes contain redundant information, only one main code is therefore effectively read. The stub code can be recognized as such and suppressed due to its shape.

The case at the bottom left in the drawing of FIG. 5 is similar. The wrapper having the main codes is here arranged at the top right and there is more than one stub code; however, they can all be recognized by their shape and suppressed.

At the top right of the drawing in FIG. 5, only one main code is readable in the bottom right corner; in addition, two stub codes recognizable by their shape in the upper right region.

At the bottom right of the drawing in FIG. 5, the wrapper that is arranged rather centrally is only partly visible due to a handle; however, a main code is read. The stub code next to it on the left has a considerably elongated shape and is recognized thereby and is suppressed.

In a test arrangement at a baggage carousel of an airport, the codes 34a-b were in total detected on 885 objects by a code reading apparatus 10 and the results with and without a filter unit 28 in accordance with the invention were compared. 772 objects were successfully read without a filter, 55 multiple readings and 58 other errors occurred. With the filter, the number of successfully read object rose to 817 with only 10 multiple readings, while the other errors remained unchanged at 58. The error rate through multiple reading was thus able to be lowered from 6.2% to 1.1% or the reading rate was increased from 87.2% to 92.3%. An error or a post-processing due to multiple reading can therefore be considerably reduced by the filter measure in accordance with the invention.

The invention claimed is:

1. An optoelectronic code reading apparatus, comprising:
   at least one camera-based code reader having an image sensor for recording image data from a reading zone,
   a control and evaluation unit comprising a decoding unit for locating code zones in the image data and for reading code content from the code zones; and
   a filter unit to determine whether a multiple reading has taken place in which a plurality of codes of different content were read, with the filter unit further being configured to check a geometry of the code zones in the case of a multiple reading in order to decide which of the plurality of read codes is a valid code and which of the plurality of read codes is an accidentally read code.

2. The code reading apparatus in accordance with claim 1, wherein the filter unit is configured to check the geometry with reference to the ratio of width to height.

3. The code reading apparatus in accordance with claim 1, wherein the filter unit is configured to check whether the geometry corresponds to a square.

4. The code reading apparatus in accordance with claim 3, wherein the filter unit is configured to recognize a code as not square with a geometry having an aspect ratio of at least 1.5;1.

5. The code reading apparatus in accordance with claim 4, wherein the filter unit is configured to recognize a code as not square with a geometry having an aspect ratio of one of at least 2:1, at least 3:1, and at least 4:1.

6. The code reading apparatus in accordance with claim 3, wherein the filter unit is configured to consider a non-square code as an invalid code.

7. The code reading apparatus in accordance with claim 1, wherein the filter unit is configured to suppress an output of code content of invalid codes.

8. The code reading apparatus in accordance with claim 1, wherein the filter unit is configured to output a multiple reading message in the case of a plurality of codes identified as valid.

9. The code reading apparatus in accordance with claim 1, wherein the filter unit is configured to output a multiple reading message in the case of no codes identified as valid, but of a plurality of codes identified as invalid.

10. The code reading apparatus in accordance with claim 1, wherein the decoding unit is configured to decode barcodes.

11. The code reading apparatus in accordance with claim 1, wherein the decoding unit is implemented in the code reader and the filter unit is implemented in a system unit outside the code reader.

12. The code reading apparatus in accordance with claim 1, wherein the decoding unit is configured to output the ratio of width to height to the filter unit.

13. The code reading apparatus in accordance with claim 1 having a geometry detection sensor for detecting code-bearing objects.

14. The code reading apparatus in accordance with claim 1, that is installed at a baggage sorting system.

15. The code reading apparatus in accordance with claim 1, wherein the baggage sorting system is installed at an airport.

16. A method of reading codes, comprising the steps of:
recording image data from a reading zone, wherein code zones are located therein;
reading code content of the code zones; and
determining whether a multiple reading has taken place in which a plurality of codes of different content were read, wherein a geometry of the code zones is checked in the case of a multiple reading in order to decide which of the plurality of read codes is a valid code and which of the plurality of read codes is an accidentally read code.

* * * * *